Patented May 21, 1946

2,400,845

UNITED STATES PATENT OFFICE 2,400,845

METHODS OF DEHYDRATION OF FOOD

Huldah A. Shepard, Chicago, Ill.

No Drawing. Application December 6, 1943,
Serial No. 513,189

5 Claims. (Cl. 99—204)

In drying foods, it is desirable from the standpoint of both economy and quality to dry the foods rapidly but without excess heat.

In the case of some acid fruits, such as rhubarb, it has been necessary, either at the time of drying, or at the time of utilizing the dried products, to add undesirably large quantities of sugar in order to overcome excessive tartness.

According to the present invention, the ends of quicker drying and reducing sugar requirements are simultaneously attained by adding to the food when it has been prepared for drying and just before the drying step a non-toxic, acid-neutralizing and gas-liberating substance, such as baking soda ($NaHCO_3$).

Although the invention may be used with various foods especially acid foods, it is particularly suitable with rhubarb because of the relatively high degree of acidity thereof. It will, therefore, be described with respect to rhubarb.

The treatment of the rhubarb may, of course, be widely varied in its details, and, for the most part, only the process at present preferred will be described. The rhubarb is first closely inspected and the leaves and any imperfections cut off. Next the stem is cut up and the cutting may be fine or coarse, rather fine cutting being somewhat preferred. It is then boiled ten to fifteen minutes or until sufficiently softened. A little water may be added at the beginning of the process if there are not sufficient juices. The cooked rhubarb may be partially dried by vacuum treatment, and, of course, the cooking itself boils off some of the water content, increasing the viscosity of the mass. The vacuum treatment may be in pans or the rhubarb may be sprayed in a vacuum.

Before the final drying, the baking soda should be added. About four teaspoons to a gallon is preferred, or three teaspoons if a very tart product is desired. The gallon measurement refers to the volume prior to cooking.

Any amount is useful, from less than one teaspoon per gallon to whatever amount will exactly neutralize all of the acid, although usually taste requirements will not permit use of this maximum quantity.

For the final drying, the rhubarb is spread in a very thin layer on a belt. This may be in accordance with prior Shepard Patent No. 2,301,-589, or prior Stuntz Patent No. 2,155,453.

It might be assumed that if soda is to be added for neutralization, it would be better to add it prior to or near the beginning of the cooking so that the resulting gases could be liberated with more certainty and driven out of the product by heat. However, this would lose most of the advantage of the gas from the standpoint of aiding in the drying of the product. The part of the dehydration which can be accomplished by boiling is the simplest part and might be aided but slightly by effervescence at that time.

On drying belts, there may be no boiling, but only evaporation. Hence, the production of gases within the product has a drying effect since the gas immediately absorbs moisture. This much is true even if the soda is mixed with the rhubarb immediately at the end of the cooking process. However, as long as the rhubarb is in the deep mass in a vat, the fine gaseous bubbles will be slow to come to the surface and liberate themselves due to the viscosity, i. e., gas retaining qualities, of the mass. Accordingly if the rhubarb is spread in a thin layer on the belt, without any great delay, most of the gaseous bubbles will still be in the rhubarb. In the thin layer on the belt they will all be so close to the surface that nearly all of them will, before the drying is complete, come to the surface and liberate themselves from the mass. As they pass out of the mass, they will, of course, take with them all of the moisture which they are capable of carrying at the elevated temperature on the belt.

The top surface of the thin layer on the belt is a relatively easy part of the layer to dry since it is directly exposed to the air which may be heated if desired. The fine bubbles tend to dry the interior of the layer to which they were first exposed. Furthermore, in breaking the surface, they tend to expose the interior part of the layer to the surrounding air and even create a slight stirring action of the layer on the belt.

Of course sugar can be added during or before the cooking process, but this is a matter of choice. In any event, much less sugar would be required than if the tartness were not reduced by the soda. Many purchasers prefer a product which has no sugar added. This part of the advantage of this invention can be attained by adding the soda early in the cooking step.

Some aspects of this invention may also be utilized in non-acid foods, or foods which do not need reduction of their tartness, by using in place of the baking soda any of the various mixtures known as baking powders. Although this lacks the advantage of overcoming excess tartness, it facilitates the final drying in the same manner as has been described in conjunction with the use of baking soda alone. The mixture includes not only the baking soda but an acid-forming substance which will react with the baking soda to produce the effervescence. Mixtures which do not produce any gas other than carbon-dioxide are preferred lest a taste be imparted to the product.

Of course instead of using a powdered mixture of the baking powder type, a harmless acid such as lactic acid or acetic acid could be added. However, it is preferred to add dry substances rather than acid solutions since the addition of a solution would mean that much more water to be evaporated. Even the addition of soda or baking powders presumably produces a little water by reaction, and it may be deemed surprising that the method of this invention nevertheless facilitates drying.

From the foregoing, it is seen that a process is provided in which the sugar requirements are reduced and the heat requirements in the final drying are also reduced. The addition of the soda accomplishes both results. Hence it might be said that the reduction in drying time or drying heat is accomplished at no cost whatever, being a by-product of adding the soda, provided that the soda is added at the right time in accordance with this invention.

I claim:

1. The process of dehydrating rhubarb which consists in cooking the rhubarb, thereafter adding sodium hydrogen carbonate thereto, and thereafter spreading the rhubarb in a thin layer for drying before the effervescent gas has freed itself from the mass.

2. The process of treating rhubarb which consists in cooking the rhubarb and adding sodium hydrogen carbonate to the rhubarb not earlier than approximately the end of the cooking process, and thereafter spreading the rhubarb in a thin layer on drying means before the effervescent gas has freed itself from the mass.

3. The process of dehydrating and partially neutralizing an acid food which consists in cooking the food to a gas retaining viscosity, adding to the food not earlier than approximately the end of the cooking process a non-toxic acid-neutralizing and effervescent substance, and thereafter spreading the food in a thin layer on drying means before the effervescent gas has freed itself from the mass.

4. The process of dehydrating food which includes the step of mixing with the food a non-toxic effervescent substance, and thereafter spreading the food in a thin layer before the effervescent gas has freed itself from the mass and applying heat to said thin layer of food.

5. The process of drying viscous food products which includes the steps of generating within the viscous food product an initially dry gas, and subsequently spreading the viscous food products in a thin layer to permit escape of entrapped gas bubbles.

HULDAH A. SHEPARD.